United States Patent [19]

McLevige et al.

[11] Patent Number: 5,048,394
[45] Date of Patent: Sep. 17, 1991

[54] MULTIPLEXED HYDRAULIC CONTROL SYSTEM WITH OSCILLATOR FOR MULTIPLEXER DRIVE

[75] Inventors: Daniel J. McLevige, Davis; Donald E. Wernberg, Rockford, both of Ill.

[73] Assignee: Woodward Governor Company, Rockford, Ill.

[21] Appl. No.: 387,177

[22] Filed: Jul. 28, 1989

[51] Int. Cl.[5] ............................................. F15B 9/09
[52] U.S. Cl. ...................................... 91/361; 91/524; 91/529; 91/461; 137/625.11
[58] Field of Search ................... 91/361, 461, 521–524, 91/529, 363 R; 137/625.11

[56] References Cited

U.S. PATENT DOCUMENTS

| | | | |
|---|---|---|---|
| 3,645,141 | 2/1972 | Moore et al. | 73/420 |
| 4,191,215 | 3/1980 | Gonner | 137/870 |
| 4,271,867 | 6/1981 | Milberger et al. | 137/625 |
| 4,325,127 | 4/1982 | Major | 364/510 |
| 4,622,998 | 11/1986 | Kussel et al. | 91/529 X |
| 4,664,136 | 5/1987 | Everett | 137/85 |
| 4,712,173 | 12/1987 | Fujiwara et al. | 364/138 |
| 4,805,515 | 2/1989 | Kast | 91/461 |
| 4,913,032 | 4/1990 | Wernberg | 91/361 |
| 4,986,305 | 1/1991 | Richards et al. | 137/625.15 |

FOREIGN PATENT DOCUMENTS 2174824 11/1986 United Kingdom .

OTHER PUBLICATIONS

"Imagine . . . A Self-Calibrating Pressure Transducer" Advertisement for Scanivalve Corp., San Diego, Calif., 1987.
"Metering Valve W/Regulator", Article, Tech Data South Bend Controls Inc., Bulletin, PV-210, SBC, 1987.
"Metering Valve", Article, Tech Data South Bend Controls Inc., Bulletin, PV-211, SBC, 1987.
Article entitled, "Actuator Accepts Electrical Digital Control Signals Directly-Eliminates Digital-To-Analog Converters".

Primary Examiner—Edward K. Look
Assistant Examiner—George Kapsalas
Attorney, Agent, or Firm—Leydig, Voit & Mayer

[57] ABSTRACT

A multiplexed hydraulic control system in which high force margins for the multiplexer are achieved by employing hydraulic oscillators as the multiplexer driving means. The multiplexer is typically in the form of a hydraulic cylinder having an input port and a plurality of output ports, with an operator in the cylinder for individually connecting the input port to the output ports. The hydraulic oscillator is mechanically coupled to the multiplexer operator, and oscillation of the former causes oscillation of the latter to sequentially connect the input to each of the outputs. Various means are taught for initiating reversal of the oscillator and controlling the oscillation speed.

21 Claims, 7 Drawing Sheets

MULTIPLEXED HYDRAULIC CONTROL SYSTEM WITH OSCILLATOR FOR MULTIPLEXER DRIVE

BACKGROUND OF THE INVENTION

1. FIELD OF THE INVENTION

This invention relates to hydraulic control systems, and more particularly to such systems in which a plurality of hydraulic actuators are to be precisely positioned in dependence on the magnitude of a similar plurality of electrical control signals.

2. DESCRIPTION OF THE PRIOR ART

There are numerous such control systems, and this invention would represent a significant advantage in connection with many of them. One exemplary and very significant application of such controls is in aircraft systems where hydraulic controls are provided for adjusting mechanical variables in jet aircraft engines. The gas turbine engines which are used to power conventional jet aircraft have commonly used hydraulic actuators for control of air valves, fuel valves, engine variable geometry, and the like. As engine designers attempt to achieve more and more performance from the gas turbine, the number of hydraulic actuators has increased significantly, and may approach 17 in number. Even gas turbine engines used on older commercial aircraft typically have on the order of six hydraulic actuators. In many cases, the actuators control functions which are critical, such as fuel supply, and on such critical functions, if control is lost, so is the engine.

Heretofore, each hydraulic actuator was provided with a device to convert an electrical input signal into a mechanical actuator position. Most typically, that had been done with a torque motor connected to and driving a hydraulic servo valve; the servo valve, in turn, controlled the supply of hydraulic fluid to the actuator. The torque motor, being dedicated to the associated actuator, could be driven for as long as additional actuator movement was desired. However, both torque motors and servo valves are fairly expensive, and both are fairly weighty components, particularly for aircraft applications where weight savings on the order of pounds can translate into substantial operating cost savings over the life of the aircraft.

Multiplexing of hydraulic circuits is not broadly new. It can be used for example in sharing a single transducer among a number of hydraulic or pneumatic channels, such as illustrated in Moore et al. U.S. Pat. No. 3,645,141. The opportunity to share a control servo valve among multiple actuators is also suggested in the literature, but on a manually controlled rather than a simultaneous multiplexed real time basis, insofar as applicant is aware. In contrast, in a true hydraulic multiplexed system, control is being maintained over all of the channels, while servicing those channels individually and separately, but with sufficient frequency to maintain the outputs as representative of the inputs in substantially real time.

Applicants are aware of a concept having been proposed to reduce weight and cost in aircraft control systems, by using a single pilot valve multiplexed among a plurality of actuators. In substance, the pilot valve has a spool which is rotated for multiplexing and which is positioned vertically by the torque motor to establish control positions. The spool and valve would be modified to provide a plurality of outlet ports at different angular positions of the spool such that the vertical control position of the valve combined with a plurality of angular multiplex positions could be used to sequentially deliver hydraulic fluid to a plurality of actuators. A position sensor on the rotary multiplexer would be used to coordinate multiplexed electrical signals for the pilot valve with the time slots of the multiplexer.

It is applicant's belief that a system of that type could not be reduced to practice for any but the most rudimentary systems because of a number of limitations, the most prominent one being the substantially reduced flow rate to any given actuator for a servo valve of any reasonable size. The flow rate reduction is a result of two factors —1) reduced flow through a pilot valve which is configured as a multiplexer, and 2) the fact of multiplexing itself which has flow going to an actuator only during its time slot. For a three channel system, the flow rate per cycle as compared to a standard non-multiplexed pilot valve would be reduced by a factor of about 18. Thus, while in principle the system might work in applications where speed of response and fineness of control are not important criteria, in a jet engine control, for example, the concept would not appear to be workable.

Even in this proposed concept, two types of actuators would be required, a first electrically responsive device for modulating the hydraulic flow in accordance with electrical control signals relating to desired actuator position, and the second actuator type for controlling the multiplexer and selecting the channel to which the modulated signal is passed. Typically, a torque motor would be used for controlling the modulation function as has been done in non-multiplexed systems. With respect to multiplex selections, since the system was rotary, in the case where a gear box drive take-off is available, the rotary commutator can simply be driven by the controlled equipment, and that type of drive is usually highly reliable. If no drive take-off from the controlled equipment is available, it may then become necessary to provide a separate dedicated drive motor for the rotary multiplexer. In order to provide good system reliability, it is necessary to choose a highly reliable motor, and even when that is done, the total system can be less reliable than using a gear box drive take-off.

In rotary systems, particularly those with a gear box drive take-off, the force available for operating the multiplexer is usually not a problem. A drive of sufficient capacity to continue rotating the multiplexer under all expected operating conditions can be provided without substantially increasing the size or weight of the system, realizing that such an increase would be contrary to the size and weight reduction to which the multiplexing concept was originally directed.

SUMMARY OF THE INVENTION

In view of the foregoing, it is a general aim of the present invention to provide a practical and reliable hydraulic multiplexed control system which does not rely upon rotary commutation for multiplexing.

One of the problems which can be encountered in eliminating rotary commutation from such a multiplexer is the provision of actuators for the multiplexer which have sufficiently high force margins. For example, torque motors or voice coils which can be used to operate the hydraulic modulator might also be applied to the multiplexer. However, in view of the multiplexing goal of minimizing size and weight, it is desirable to utilize rather small actuators. However, this may result in actuators which have adequate force to operate the multiplexer under most operating conditions, but which might not be sufficiently powerful to operate the multiplexer under abnormal conditions—i.e., the actuators might not have an adequate (under all circumstances) force margin.

In that regard, it is an object of the present invention to provide a reliable highly accurate multiple channel hydraulic control system in which the actuators for the multiplexing devices are easily configured to have high force margins.

In that regard, it is a further object of the invention to minimize the use of electrical actuators in controlling the multiplexing of a hydraulically multiplexed control system.

It is a feature of the present invention that size and weight reduction are achieved in a multiple channel hydraulic control system by provision of a multiplexing valve in the form of a hydraulic valve, typically a hydraulic cylinder having a single input port and multiple output ports individually selectible by an operator of the valve. Hydraulically actuated means are mechanically coupled to the operator of the multiplexer valve, and the hydraulically actuated means is supplied with hydraulic fluid by valve means which causes the hydraulically actuated means to oscillate between a pair of end positions. A mechanical connection between the hydraulically actuated means and the operator of the multiplexing valve thereupon causes the multiplexer to sequentially connect the inlet port to each of the output ports in turn as the hydraulically actuated means oscillates between its end points. By virtue of using a hydraulic oscillator for controlling the multiplexer position, the hydraulic drive can be easily configured of sufficient size as compared to the size of the multiplexer to provide force margins which are higher than those normally achievable with electrical actuators.

It is a feature of the present invention that the means for controlling the multiplexer means, in the form of a hydraulic oscillator, is of simple and reliable configuration while providing force margins which are more than adequate for the multiplexer with which it is used.

Other objects and advantages will become apparent from the following detailed description when taken in conjunction with the drawings, in which:

While the invention will be described in connection with certain preferred embodiments, there is no intent to limit it to those embodiments. On the contrary, the intent is to cover all alternatives, modifications and equivalents included within the spirit and scope of the invention as defined by the appended claims.

DETAILED DESCRIPTION OF THE PREFERRED EMBODIMENTS

Figure 1:
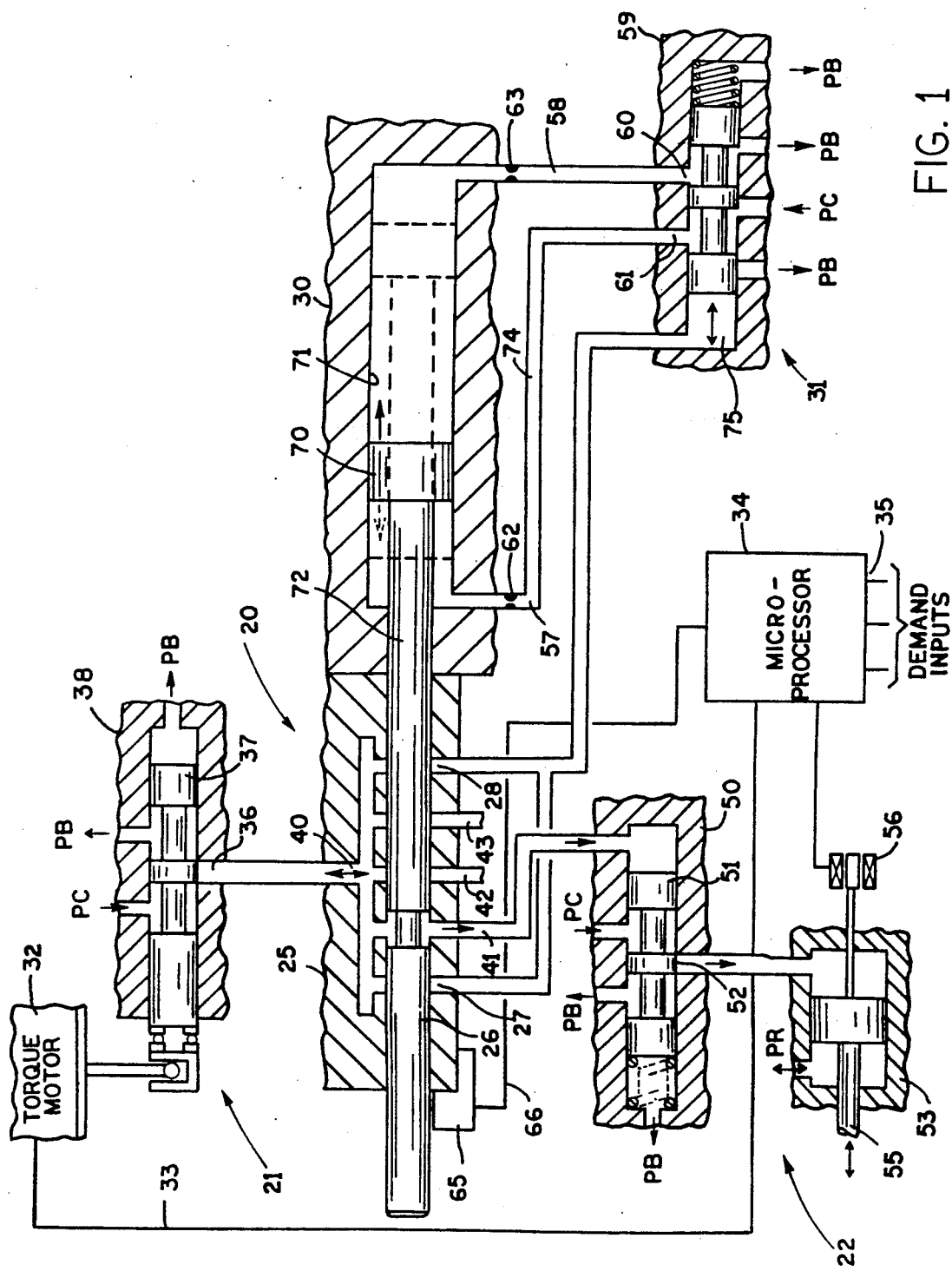
FIG. 1 is a diagram illustrating a multiplexed hydraulic control system exemplifying the present invention and utilizing hydraulic means for reversing the hydraulic oscillator.

Turning now to the drawings, FIG. 1 shows a multiplexed hydraulic control system exemplifying the principles of the present invention. The system includes a multiplexer generally indicated at 20 having a modulated hydraulic input 21 adapted to produce hydraulic flow rates which are distributed by the multiplexer 20 to a plurality of channels 22. The multiplexer 20 in the embodiment illustrated in FIG. 1 includes a hydraulic cylinder 25 having a reciprocatable operator 26 therein adapted for reciprocation between a pair of end points defined by ports 27, 28. It will be appreciated upon an understanding of the present disclosure that end points are not intended to be restricted to physical absolute limit of travel points of the hydraulic cylinder, but are simply intended to mean the positions associated with the end serviceable ports in the multiplexer.

In accordance with the present invention hydraulic oscillator means, shown herein as including a double-acting cylinder 30, is provided for driving the multiplexer 25 to connect the modulated input 21 to each of the output channels 22 in a predetermined sequence. To that end, the double-acting cylinder is associated with driving means 31 for causing the cylinder to reciprocate and connecting means 72 for connecting the reciprocating cylinder 30 to the multiplexer 25. As will be described in greater detail below, the driving means 31 provides hydraulic fluid to the double-acting cylinder 30 causing it to oscillate from end to end of its travel, and the connecting means 72 thereby causes the multiplexer 25 to similarly oscillate from end to end of its travel, thereby sequentially connecting the hydraulic input from modulated source 21 to the output ports 22 in turn.

Referring in greater detail to the system of FIG. 1, it is seen that there is provided a modulated source of hydraulic fluid 21, in the illustrated embodiment such modulated source being provided by a torque motor 32 having an electrical input connection or bus 33 coupled to a controlling microprocessor 34. The microprocessor 34 produces a series of signals on its output bus 33 which are in part determined by demand input signals 35 coupled to the microprocessor 34 by external equipment, and in part determined by feedback signals relating to actuator positions to be described below. In any event, the bus 33 represents a time division multiplexed bus which is coupled to the torque motor 32 for controlling the hydraulic flow from source PC or sump PB through an output port 36 which in turn is coupled to the multiplexer as an input. Depending on the signal applied to the torque motor 32, a spool 37 in the control valve 38 will cause the connection of the hydraulic source PC or hydraulic sump PB to the outlet port 36, with the degree of opening of the valve and thus the rate of flow through the valve being dependent upon the magnitude of the signal applied to the torque motor 32. In practicing the invention, the signals applied to the torque motor 32 by way of the bus 33 are representative of the desired positions of the multiplicity of actuators controlled by the multiplexed control system, and the multiplexer 20 serves to couple the signal of appropriate hydraulic magnitude produced by the modulator 21 to the appropriate output channel 22.

Referring in greater detail to the multiplexer 20, it is seen that there is provided a single inlet port 40 and a plurality of output ports including the aforementioned end ports 27, 28 and intermediate output ports 41-43 which are connected to and drive the channels 22. The output connections for one of the channels, namely, the channel connected to output port 41, is illustrated as including a second stage valve 50 having a spool 51 positioned in response to flow rate from the multiplexer valve, and having an outlet port 52 which connects a hydraulic actuator 53 to either the hydraulic source PC or hydraulic sump PB in dependence on the position of the spool 51. Thus, if flow from the multiplexer valve forces the second stage valve spool 51 to the left, there is a path for fluid flow between the source PC through the outlet port 52 to the actuator 53 thereby driving a piston 55 in the advance direction for adjusting the appropriate aircraft mechanical variable. Feedback means 56 is coupled to the actuator 55 for providing an indication of the actuator position, and also for providing an indication of rate of movement of the actuator which is useful in stabilizing the control system, as will be described below.

It will be appreciated that the second stage valve, actuator, and feedback elements associated with the output port 41 are replicated with respect to each of the other output ports and that therefore the modulated fluid source 21 is coupled to appropriate ones of the output channels for controlling the rate of movement and position of the hydraulic actuators (such as actuator 53) in the respective output channels.

The embodiment illustrated in FIG. 1 demonstrates a first form of hydraulic oscillator means, which includes a hydraulically reversible double-acting cylinder 30 for controlling the position of the multiplexer valve 20. In the illustrated embodiment, the double-acting cylinder 30 has a pair of inputs 57, 58 controllably supplied with hydraulic fluid by driving means 31 which include oscillator control valve 59. The oscillator control valve 59, in turn, in the FIG. 1 embodiment, has a position which is controlled by the multiplexer 20.

It is seen that the oscillator control valve 59 has the hydraulic source PC and hydraulic sump PB connected to the input ports thereof, and has a pair of output ports 60, 61 coupled to the respective ends of the double-acting hydraulic cylinder 30. When the control valve 59 is positioned in its right-hand operating position as shown in FIG. 1, the hydraulic source PC is connected through the output port 61 to the left-hand chamber of the cylinder 30, the hydraulic sump PB is connected through the output port 60 to the right-hand chamber of the hydraulic cylinder 30, and thereby the hydraulic actuator is driven from the left to the right as illustrated by the solid arrow in FIG. 1. The restrictions 62, 63 in the respective lines feeding the hydraulic actuator demonstrate that the movement is controlled and that the actuator sequences in a controlled and measurable fashion between its end points. It will be appreciated that the degree to which the control valve 59 is opened, in view of the restrictors in the lines feeding the hydraulic oscillator 30 will determine the rate at which the hydraulic valve 30 oscillates.

In practicing the invention, a mechanical connection 72 is provided between the hydraulic oscillator 30 and the multiplexer 20 such that as the hydraulic oscillator 30 oscillates, the mechanical connection causes the multiplexer 20 to also oscillate, causing the sequential coupling of the inlet 40 to individual ones of the output ports 27, 41, 42, 43, 28, 43, etc.

As a result, the modulated flow produced in the control channel as a result of signals applied to the torque motor 32 are coupled through the multiplexer to the appropriate second stage valves which control the rate of movement of the output actuators 53 and ultimately the final positions thereof. The microprocessor 34 has available to it signals from the actuator transducers 56 (which indicate the actual actuator positions as well as rates of movement), and also has available to it signals from a position sensor 65 associated with the multiplexer 20 which indicates the identity of the channel being serviced at that point in time, such that the modulating signals on the bus 33 are coordinated with the position of the multiplexer 20.

As will become more apparent, the embodiments of the invention share the feature of a reciprocatable hydraulically driven multiplexer (having substantial force margins) for selecting the individual channels, but differ in the manner in which the direction and rate of movement of the multiplexer is controlled. In the FIG. 1 embodiment, the multiplexer control is also hydraulic, including the hydraulically operable oscillator control valve 31 which feeds the double-acting cylinder 30 to translate a piston 70 within a cylinder 71 and, by means of the mechanical connection 72, to thereby translate the multiplexer 20 to sequentially connect the single inlet with individual ones of the output ports. Thus, in the FIG. 1 embodiment, means are provided for interconnecting selected ones of the hydraulic outputs, particularly the end channels 27, 28 in the illustrated embodiment, with the oscillator control valve 31 for controlling the direction and rate of movement of the multiplexer 20.

More particularly, in the embodiment illustrated in FIG. 1, the end ports 27, 28 are connected to the oscillator control valve 59 for causing the reversal of multiplexer movement as the multiplexer 20 reaches its end positions. For example, when the multiplexer 20 reciprocates to its rightmost position, the modulated hydraulic flow introduced into the multiplexer at the input 40 is coupled to the output 28 which in turn is coupled to a chamber 75 of the oscillator control valve 59. In order to reverse the direction of oscillator travel, at the time the multiplexer couples the inlet 40 to the output 28, the torque motor 32 is driven to connect hydraulic sump PB to the modulator output port 36. Thus, fluid is drained from the control chamber 75 and the spool moves from the right-hand operating position illustrated in FIG. 1 to a similar left-hand operating position in which the hydraulic source PC is coupled to the oscillator control valve output port 60 and sump PB to the port 61. The reversal of pressures on the piston 70 then reverses the travel of the piston (and coupled multiplexer) to the direction indicated by the dashed line arrow of FIG. 1, thereby sequentially connecting the multiplexer inlet 40 to the ports 43, 42, 41 and 27 in sequence. When the multiplexer reaches its leftmost limit of travel, coupling the inlet 40 to the output 27, the microprocessor 34 drives the torque motor 32 in such a way to couple the high pressure source PC through the output 36 of the modulating valve 21, thereby directing fluid flow into the control chamber 75 of the oscillator control valve 59, and returning that valve to its right-hand operating position to again reverse the direction of multiplexer travel from left to right as illustrated in the drawing. It will be noted that the magnitude of the signal applied to the torque motor 32 by the microprocessor 34 at the time of reversing the oscillator control valve 59 determines the amount of fluid pumped into or removed from the control chamber 75 and thus the degree of opening of the oscillator control valve 59. Thus, the microprocessor 34 by this mechanism has direct control on the rate of multiplexer translation and thus the timing of the multiplexed sequencing between the output ports.

It will be apparent before turning to additional embodiments of the present invention, that the invention encompasses multiplexers other than the linear cylinder illustrated in FIG. 1, so long as the multiplexers are driven by hydraulic oscillators. For example, it is possible to drive a rotary multiple output valve as a multiplexer to sequentially connect a single input to individual outputs. Such a drive can be by way of the linear oscillator of FIG. 1 with a modified connecting means linking the oscillator driver and the multiplexer, the modifying connecting means serving to provide a linear to rotary translation. Such modified connecting means can, for example, be in the form of a pawl and ratchet drive or a gear and rack arrangement which serves to control the position of a rotary multiplexer in dependence on the linear position of the driving means. Alternatively, a rotary hydraulic oscillator can also be utilized.

It will thus be seen that the first embodiment of the present invention fulfills the objects thereof by providing a modulated source of hydraulic fluid 21 which is coupled individually and selectively to a plurality of channels 22 by means of a multiplexer valve 20 driven by a hydraulic oscillator. The multiplexer valve is preferably of the type which has a reciprocatable spool having an inlet port 40 and a plurality of outlet ports 41-43 to sequentially couple the modulated hydraulic source to the various channels for controlling the appropriate second stage valves 50, coupled actuators 53, and feedback means 56.

For determining the position of the multiplexer 20 in order to provide an appropriately modulated hydraulic signal to such multiplexer for distribution to the selected channel, feedback means 65 are provided for detecting the position of the multiplexer 20 and providing a signal on a line 66 to the microprocessor 34. The microprocessor 34 senses the position of the multiplexer operator, and in response thereto modulates the input to the torque motor 32 in accordance with the electrical control signal corresponding to the output port of the channel then connected to the output of the multiplexer.

It is worthwhile to note, with respect to the overall size of the complete multiplexing system, that it is of no significant movement to configure the driving means 30 with a piston 70 of sufficient diameter to operate the multiplexer 20 reliably under all expected operating conditions. Configuring the driving means 30 with a piston of sufficient size produces only a slight increase in size of the overall system, but since the area of the piston is determinative of the force generated, can produce a significant increase in driving force, thereby increasing the force margin available for driving the multiplexing selector 20.

Thus, all that is needed to drive the multiplexed control system is an electrical signal coupled to the torque motor 32 along with position signals derived from the multiplexer for signalling the microprocessor 34 of the channel then being serviced, so that the microprocessor 34 can coordinate the production of the appropriate modulated hydraulic signal while such modulated signal is being coupled to the selected channel.

With respect to control of the system, the microprocessor 34 produces a time division multiplexed series of signals for coupling onto the bus 33 for controlling the magnitude of the multiplexed hydraulic signal which is then distributed by the multiplexer 20. To that end, the microprocessor 34 responds to a plurality of electrical control signals which are coupled to it on demand inputs 35 and to feedback signals from the actuators 53 produced by feedback means 56 which signal the microprocessor 34 as to the actual position of the actuator 53 and the rate of travel of the actuator when the actuator is moving. Since the modulated flow produced by the modulator 21 is integrated by the second stage valve 50, and the flow which the second stage valve 50 produces is integrated by the actuator 53, means must be provided for stabilizing the control loop which contains two serially connected integrators. The rate feedback provided by feedback means 56 is important in stabilizing such a system as has been described more completely in Leeson et al. U.S. application U.S. Pat. No. 4,984,505. That patent describes both the feedback means and additional details of the control circuitry and, to the extent necessary, the specification of this patent is incorporated herein by reference.

Figure 2:
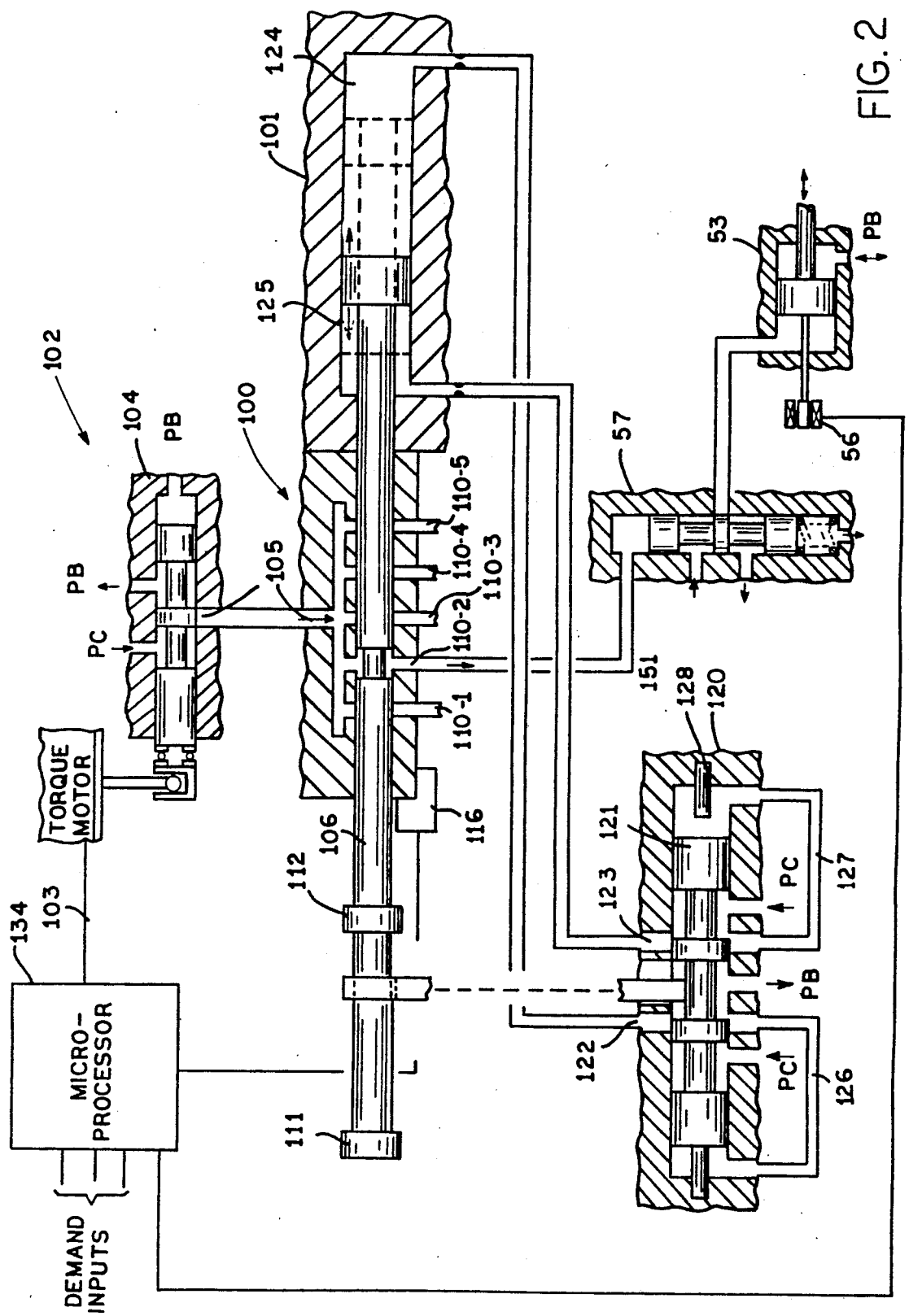
FIG. 2 is a diagram illustrating a further embodiment of the present invention and utilizing mechanical/hydraulic means for reversing the hydraulic oscillator.

FIG. 2 illustrates an embodiment of the invention similar to that of FIG. 1 but in which the oscillation of the control system is reversed by mechanical means responsive to the position of the multiplexing valve. More particularly, there is shown a multiplexer valve 100 which, as in the previous embodiment, is driven by a double-acting hydraulic cylinder 101 which is driven to oscillate between a pair of end positions. The input for the multiplexer is derived from an electrically actuated hydraulic modulator 102 which is responsive to electrical signals on a time division multiplexed bus 103 for controlling the flow rate through a valve 104, the flow rate serving as an input 105 to the multiplexing valve 100. It is seen that the multiplexing valve 100 has a plurality of output ports 110-1 through 110-5 which are connected to associated channels including second stage valves such as the second stage valve 51 connected to output port 110-2. As in the prior embodiment, second stage valve 51 drives a hydraulic actuator 53 which has feedback means 56 for signalling position information to the microprocessor 134.

For purposes of controlling the direction of multiplexer travel, and for reversing such direction, means are provided for coupling a signal, in the illustrated embodiment a mechanical signal, between the multiplexer means and its multiplexer control valve 120. To that end, a link 109 is provided which is engaged by stop means 111, 112, depending on which limit of multiplexer travel is then being reached, to deflect link 109 in the direction of movement of the engaging stop means 111 or 112. The mechanical signal derived from the oscillating multiplexer serves to signal the oscillator control valve 120 to drive its spool 121 either to the left or to the right depending upon the direction of movement of the reciprocating actuator 106 in the multiplexer means 100. Assuming, for example, that the actuator 106 is being driven to the right, the multiplexer control valve 120 would be in its left-hand operating position as illustrated in FIG. 2 in order to drive the multiplexer in the stated direction. Fluid flow for driving the multiplexer in the right-hand direction is by way of the multiplexer control valve 120, particularly the high pressure hydraulic source PC is coupled through an outlet port 123 to the left-hand chamber 125 of cylinder 101 and sump PB is coupled through outlet port 122 of the valve 120 to the right-hand chamber 124 of the double-acting cylinder 101. As the multiplexer continues it rightward travel as illustrated by the solid line arrow, it completes the servicing of output ports 110-3, 110-4 and 110-5 following which the stop means 111 engages the control link 109, shifting the spool 121 in the multiplexer control valve 120 to the right. As a result, the ports 122 and 123 are initially closed then opened to the opposite pressures, outlet port 122 being opened to hydraulic source and output port 123 to hydraulic sump to reverse the direction of multiplexer travel from right to left as illustrated by the dashed arrow. The control valve 120 includes hydraulic feedback means for assuring that the translation of the spool 121 which is initiated by engagement of stop means 111 with control link 109 is completed and the spool 121 is fully translated to one of its two operating positions. To that end, the valve 120 includes a pair of feedback connections 126, 127 operated by the same lands which control the output ports 122, 123. Thus, during rightward travel of the multiplexer after the stop means 111 begins the translation of the spool 121 to the right by engaging link means 109, the lands open left-hand passage 126 to hydraulic source PC and the right-hand passage 127 to hydraulic sump PB, imposing source pressure on the left-hand end of the spool 121 and sump on its right-hand end, fully translating the spool to the right until it engages a stop member 128. In that condition, a controlled hydraulic flow of PC and PB to the chambers 124, 125, respectively, is continued to controllably translate the multiplexer from its rightmost position to the left, sequentially servicing the ports 110-5 through 110-1. Thereupon, the stop member 112 translates the link means 109 to the left, the pressures in the output ports 122, 123 are again reversed and the feedback ports 126, 127 are reversed to initiate a reversal in control valve and multiplexer travel. It is seen that the multiplexer 100 also includes feedback means 116 for providing a signal to the microprocessor 134 indicating which channel the microprocessor is servicing so that the appropriate electrical modulating signal can be coupled to the TDM bus 103. It will be appreciated that the position sensor 116 can be utilized in place of the stop members 111, 112 for providing an electrical signal operable on a solenoid or the like for translating the link member 109 to initiate a multiplexer reversal.

Figure 3:
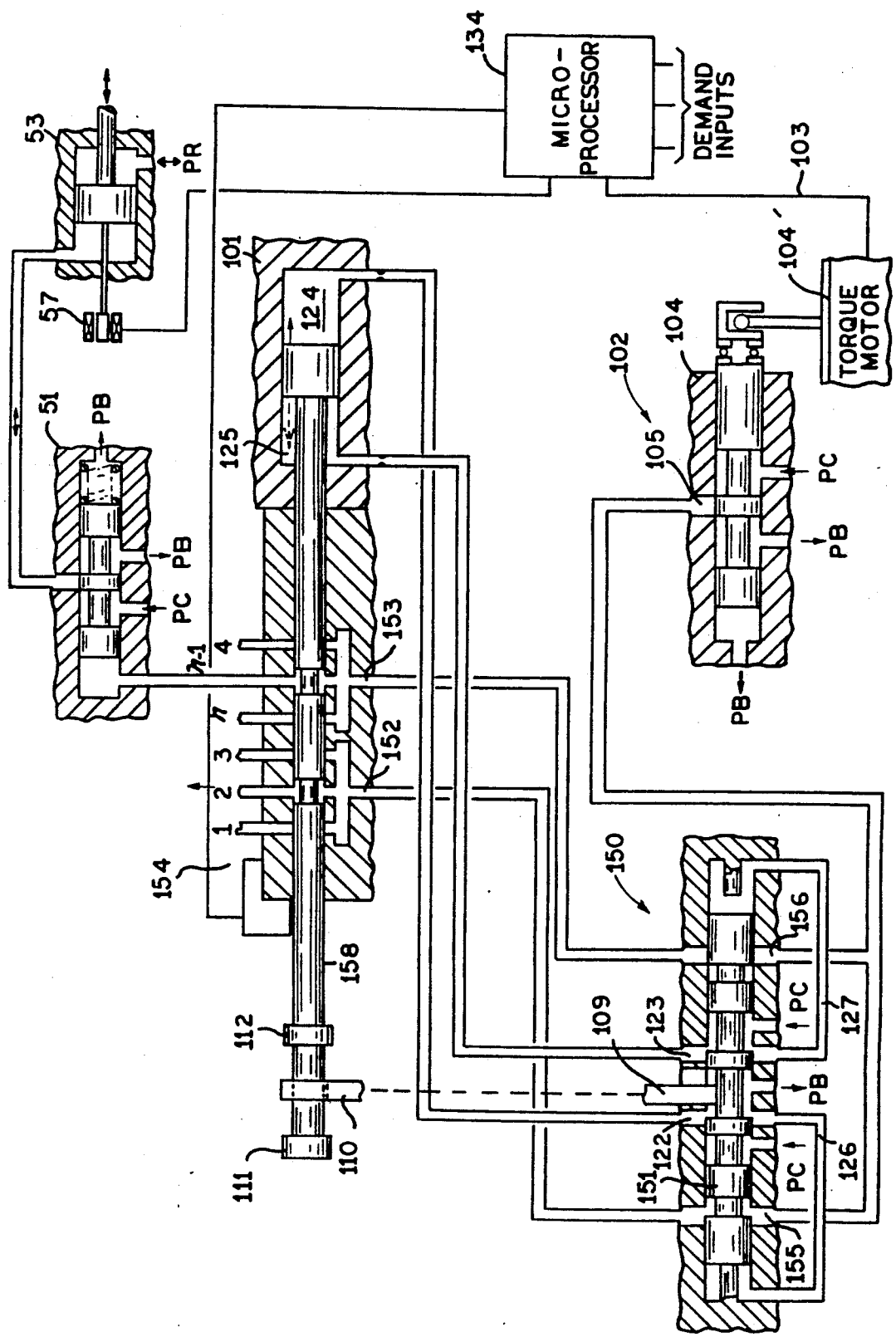
FIG. 3 is a diagram illustrating a further embodiment of the present invention which is like the FIG. 2 embodiment except that the outlet ports are actuated in a repeating sequence from 1 to n.

FIG. 3 illustrates a slightly modified embodiment of the invention in which, at the expense of slight additional complexity in the multiplexer control valve 150, the hydraulic multiplexing system is provided the ability to sequence the output channels in a repeating sequence from 1 through n. It will be appreciated that as the prior embodiments were described, the channels were sequenced from 1 through n and then from n through 1 following which the sequence repeated, thus producing dead times between cycling of particular channels which were different depending on whether the multiplexer was traveling in one direction or the other. In the embodiment illustrated in FIG. 3, the dead time between cycling of any particular channel remains the same, and the channels are always sequenced from 1 through n, and the sequence again begun at 1.

As in the prior embodiment, a modulated source of hydraulic fluid 102 is provided, the modulation again accomplished by a valve 104 driven by a torque motor 104' responsive to signals on a TDM bus 103 produced by a modulator 134 all as described above. Also as described above, each of the output channels 1-n includes a second stage valve 51 driving a hydraulic actuator 53 which has feedback means 57 producing a signal which is coupled back to the microprocessor 134.

In contrast to the prior embodiments, instead of coupling the modulated hydraulic signal produced at port 105 by the modulator 102 directly to the multiplexer, the modulated source is coupled to the multiplexer by way of the multiplexer control valve 150. Insofar as it relates to driving and reversing of the double-acting hydraulic cylinder 101, initiation of direction reversal by means of a mechanical signal coupled by stop members 111, 112 to control link 109, and hydraulic feedback to assure full reversal by means of hydraulic connections 126, 127, the operation of control valve 150 is identical to that of control valve 120 of FIG. 2 and the same reference numerals have been used for the corresponding elements. In addition to those functions, however, the hydraulic valve 150 controls the application of the modulated hydraulic signal produced by source 102 to a pair of inputs 152, 153 of the multiplexer generally indicated at 154. It is seen that the output port 105 of the hydraulic source 102 is coupled to a pair of input ports 155, 156 of the multiplexer control valve 150. In the illustrated left-hand operating position of the control valve 150, the hydraulic source 102 is coupled via port 155 to the multiplexer input 152 which input services the ports 1, 2 and 3. Thus, as the valve actuator 158 is translated to the right as indicated by the solid line arrow, the ports 1, 2 and 3 will be activated in sequence to pass modulated hydraulic flow through the multiplexer input port 152 to those output ports. Thereupon, the multiplexer will reach its rightmost end of travel whereupon stop member 111 will engage control link 109 and shift the spool 151 of the control valve 150 to its right-hand operating position. As in the prior embodiment, hydraulic feedback will assure the spool travels to engage the mechanical stop, and flow to the double-acting cylinder 101 will be reversed to drive the cylinder and its connected multiplexer in the left-hand direction as indicated by the dashed arrow. However, in addition to those operations, translation of the spool 151 of the control valve 150 to the right-hand position will close the port 155 and open the port 156 to couple the modulated hydraulic source 102 to the second multiplexer input port 153. At that point, the actuator 154 will have the input 153 open to the outlet port which services channel 4, thereby coupling the modulated hydraulic source 102 to that channel. Further translation of the multiplexer in the left-hand direction as indicated by the dashed arrow will thereupon service the succeeding channels n−1 and n, following which the stop member 112 will engage the control link 109 to drive the spool to the left and re-initiate the sequence.

Figure 4:
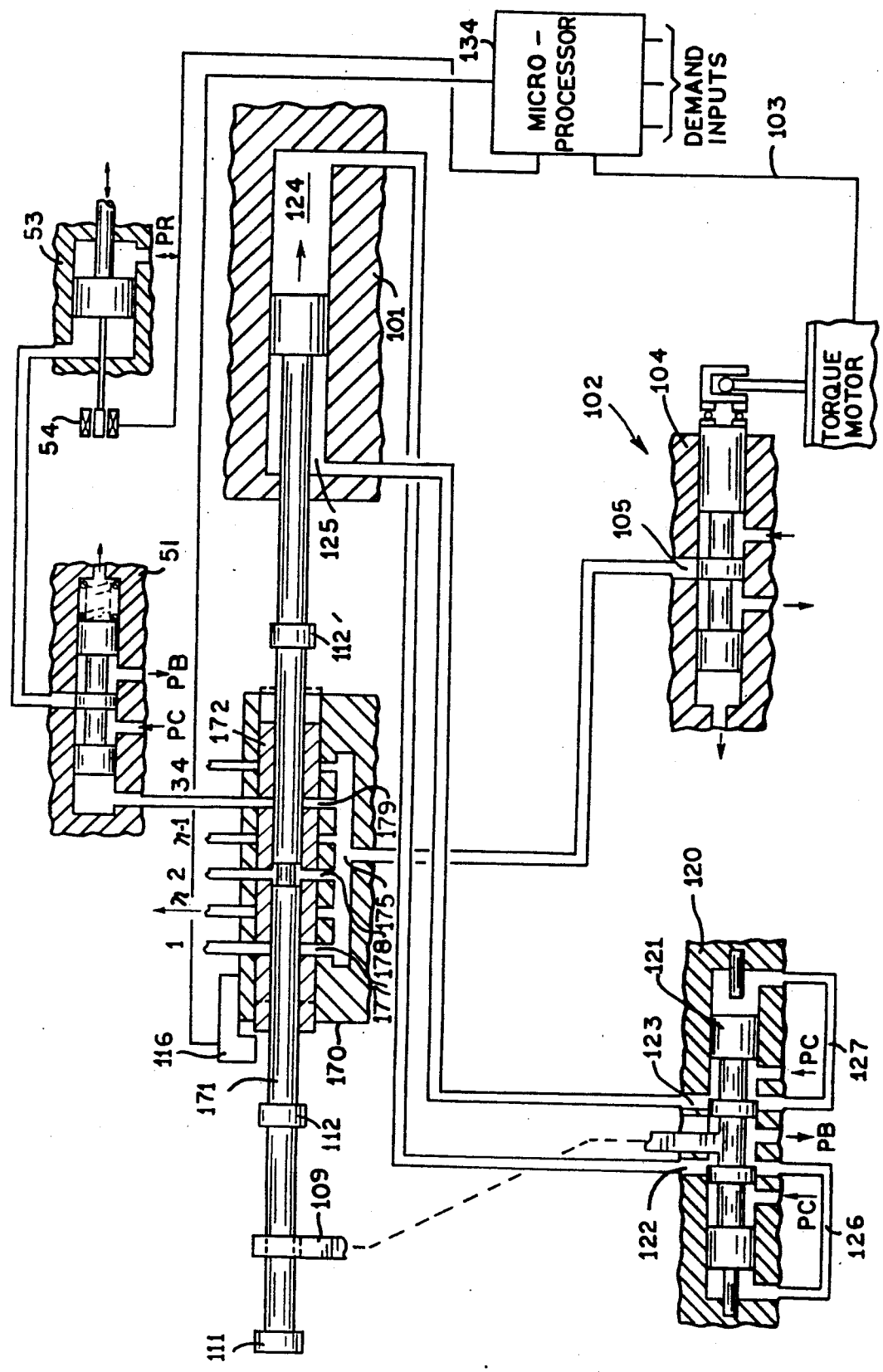
FIG. 4 is a diagram illustrating a further embodiment of the present invention providing a sequence similar to the embodiment of FIG. 3.

The embodiment of FIG. 4 is functionally similar to FIG. 3 in that it produces a repeating sequence for servicing of the output ports from 1 through n. However, the means for accomplishing such repeating sequence is somewhat different than the embodiment of FIG. 3. Such difference is primarily in the multiplexing valve 170 which includes not only an operator 171 for sequentially activating the ports, but a second two-position slidable sleeve 172 which assists in achieving the repeating 1 through n sequence. Except for those differences, the system of FIG. 4 is identical to that of FIG. 2 and the same reference numerals have been used for similar elements.

Referring in greater detail to the multiplexing valve 170, and with particular reference to the differences over the foregoing valves which achieve the 1 through n sequencing, it is seen that the output 105 of the hydraulic modulator 102 is coupled to a manifold 175 within the multiplexer which is associated with the sleeve 172. It is seen that the sleeve 172 for a six input manifold 175 has only three passages 177–179 for interconnecting the input manifold 175 with the multiplexer operator 171. It will be seen that in the illustrated condition the modulated hydraulic flow produced at the output 105 of the modulator 102 is coupled through the passage 178 to output port No. 2. As the multiplexer continues to sequence to the right under the assumed conditions, the port No. 3 will next be activated by way of passage 179 in the sleeve 172. At that point, the multiplexer will have traveled to its rightmost limit, the stop means 111 will engage the control link 109, and the spool 121 will be shifted to its rightmost control position, reversing the direction of travel of the double-acting cylinder 101. In addition, when the multiplexer reaches its rightmost position the stop member 112 will engage the sleeve 172 and translate the sleeve to the right dashed line position in which the ports 177–179 are shifted one position to the right, thereby connecting the alternate ports of manifold 175 to the operator 171. Thus, as the multiplexer sequences from right to left with the sleeve 172 in its dashed line condition, the ports 4, n−1 and n will be actuated in sequence. At that point, the multiplexer will have reached its leftmost condition in which the stop 112 will engage the control link 109 to shift the valve 120, and a further stop 112' will engage the sleeve means 172 to return it to the solid line position of FIG. 4 ready to commence a further sequence of cycling the output ports from 1 through n.

The embodiments described thus far have illustrated various means for oscillating the high force margin actuator between its first and second end positions. In the FIG. 1 embodiment, for example, the entire control including reversal and rate of travel was accomplished hydraulically. In the embodiments illustrated in FIGS. 2–4, mechanical means was provided for producing a mechanical signal to initiate reversal, and in those cases hydraulic means was also provided to complete the valve reversal. It is, of course, possible to eliminate the latter in many circumstances and simply allow the mechanical signal to reverse the oscillator control valve means, with the position associated with such valve means controlling the direction of oscillation without the need for a further feedback.

Figure 5:
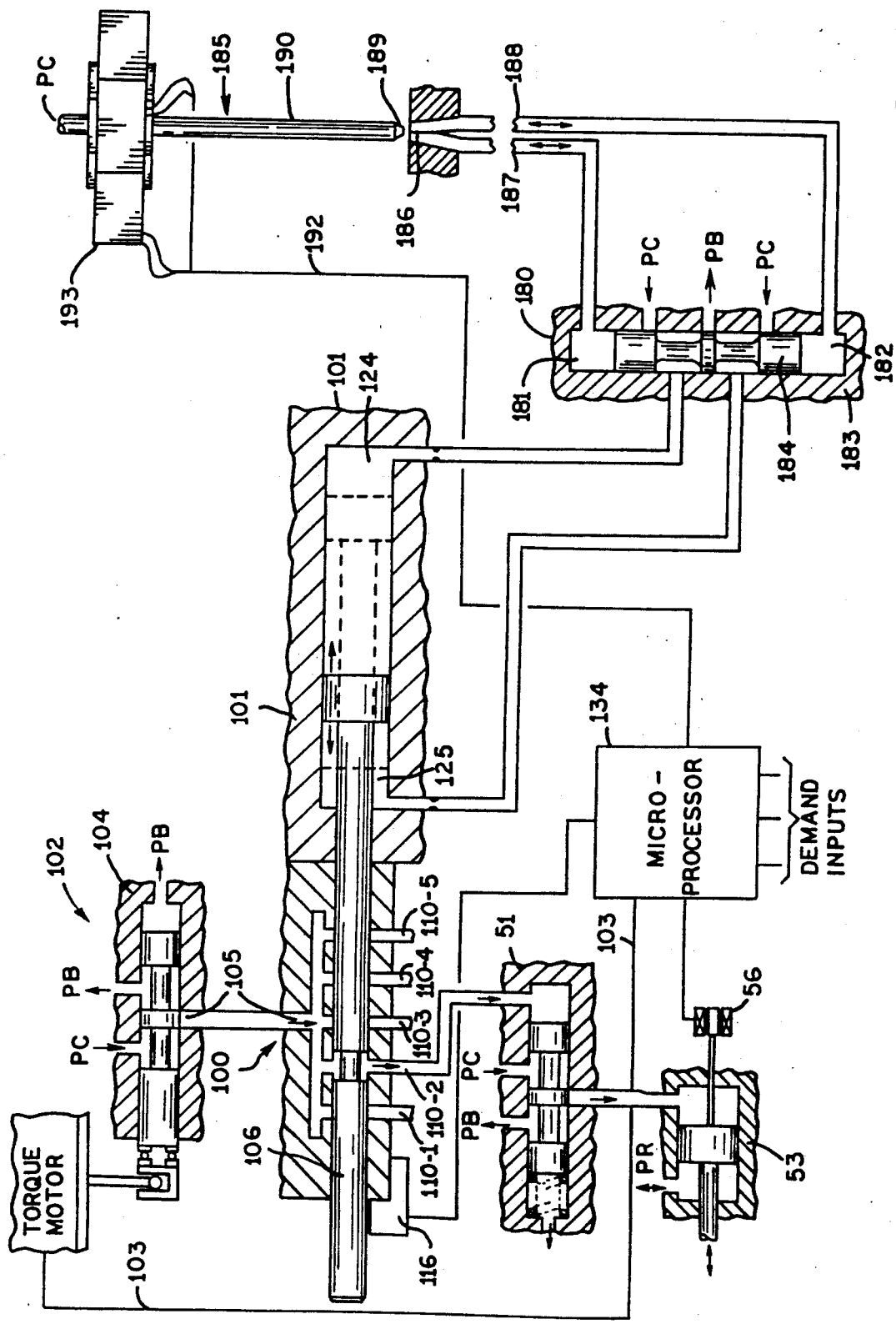
FIG. 5 is a diagram illustrating a further embodiment of the present invention and utilizing electrical means for controlling the speed and direction of the hydraulic oscillator.

FIG. 5 illustrates a system which is similar to those illustrated in the earlier drawings in its use of a hydraulic oscillator for driving the multiplexer, the oscillator including a double-acting cylinder 101 driven by an oscillator control valve 180. Since it is only the control valve 180 and the elements which drive it which differ from the system of FIG. 2, the reference numerals on the remaining elements of FIG. 5 are the same as used in FIG. 2, and those elements will not be further described here.

Turning to the control elements for the oscillator control valve 180, it is seen that such valve includes a pair of chambers 181, 182 disposed in a valve body 183 at either end of a displaceable spool 184. In contrast to the mechanical or hydraulic elements which serve to reverse and control rate of travel of the oscillator control valve of prior embodiments, electrical means generally indicated at 185 are associated with the control valve 180 for controlling fluid flow into chambers 181, 182 and thereby the direction and rate of movement of the double-acting cylinder 101.

More particularly, the control means 185 is configured as an electrically responsive jet pipe including a jet pipe receiver 186 having a pair of channels 187, 188 coupled between the outlet 189 of the jet pipe 190 and the chambers 181, 182 of the valve 180. Thus, depending on the split of flow into the conduits 187, 188 in dependence upon the position of the output 189 of the jet pipe 190, the pressure in chambers 181 and 182 will be controlled. For example, if the jet pipe 190 is deflected to the left, there will be a greater pressure in chamber 181 than in chamber 182, and the spool 184 will be deflected downwardly, connecting the hydraulic source PC to the left-hand side of the piston in double-acting cylinder 101 and sump to the right-hand side. As a result, the double-acting cylinder 101 will drive its piston to the right, connecting the multiplexer input 105 to the output ports 110-1 through 110-5 in that sequence. As in the prior embodiments, feedback means 116 produces a signal representative of the position of the multiplexer and couples such signal to the microprocessor 134. When the microprocessor 134 determines that the multiplexer has reached its rightmost limit, it will produce a signal on an output line 192 which controls the electrical actuator 193 of the electrically responsive assembly 185. The actuator 193 will then deflect the jet pipe 190 to the right, producing a higher pressure in chamber 182 than in 181, raising the spool 184 and thus reversing the direction of travel of the double-acting cylinder 101 with connected multiplexer 100. In the FIG. 5 embodiment, it will be appreciated that the magnitude of the electrical signal coupled by the microprocessor 134 to the electrical actuator 193 will determine the pressure differential between the chambers 181, 182 and thus the rate of travel of the multiplexer. Since the microprocessor 134 can adjust the magnitude of the signal applied to the actuator 193, in dependence upon sensed conditions, the FIG. 5 embodiment demonstrates the advantage of a sequentially operated multiplexer with a travel rate which can be varied during operation to satisfy operating conditions then being encountered.

Figure 6:
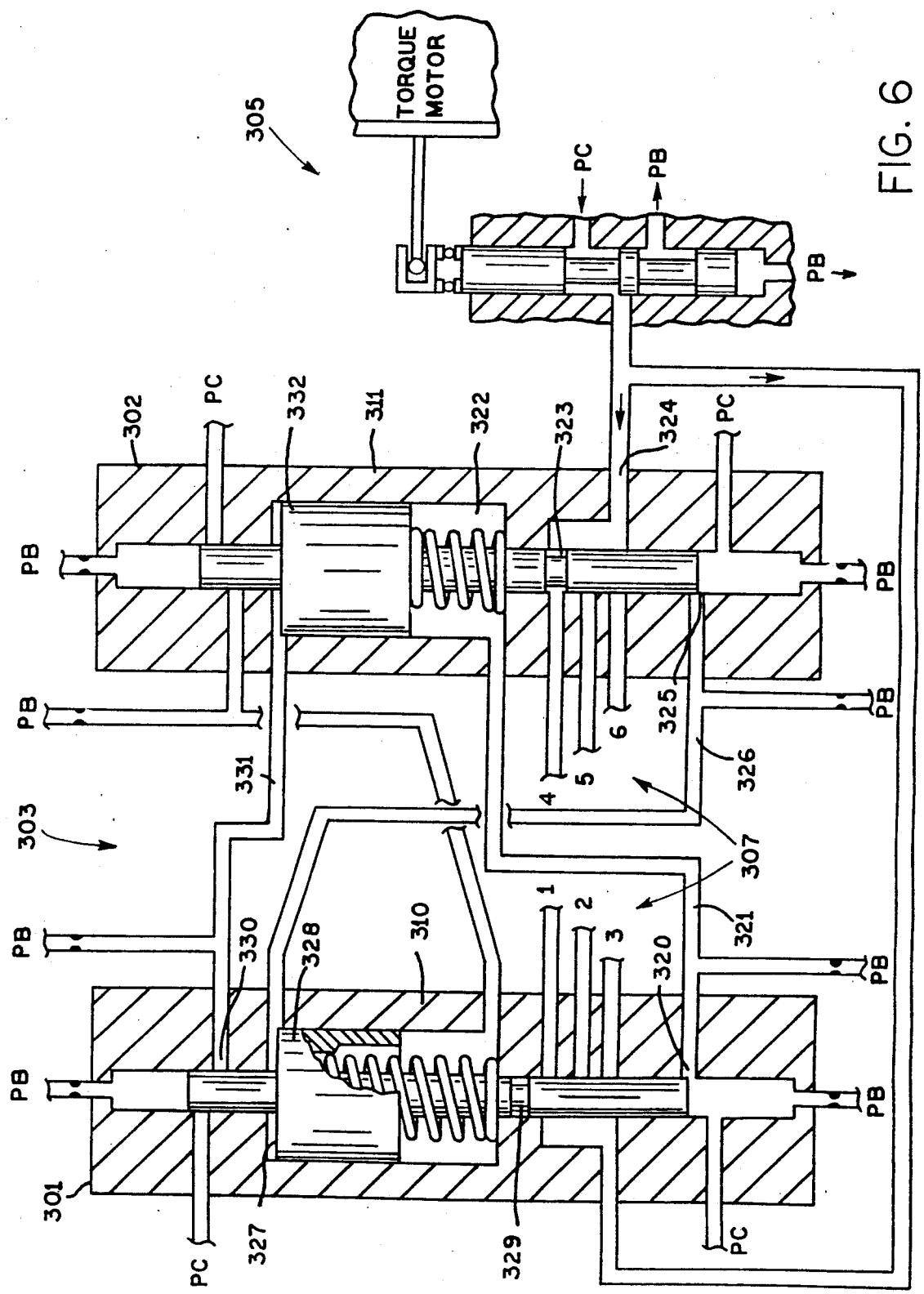
FIG. 6 is a diagram illustrating a further embodiment of the present invention and utilizing a pair of multiple port sequencers cross-coupled for oscillation.
Figure 7:
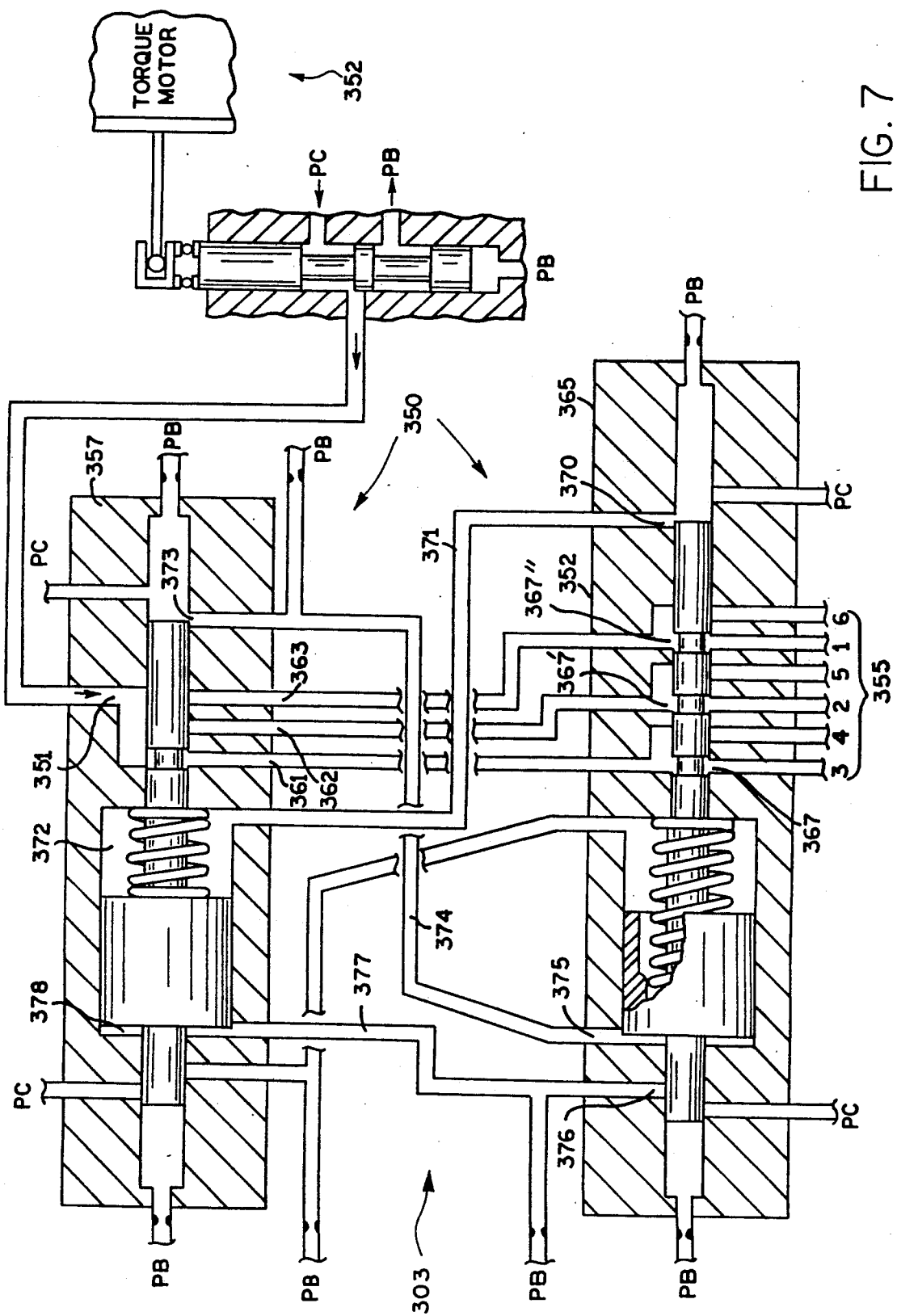
FIG. 7 is a diagram illustrating a further embodiment of the present invention like FIG. 6 but in which the ports are actuated in a repeating sequence from 1 to n.

FIGS. 6 and 7 illustrate further embodiments of the present invention in which, in contrast to the previous figures where the hydraulic oscillator was in the form of a single multiplexing cylinder driven first in one direction and then in the other by an oscillator control valve, the hydraulic oscillator of FIGS. 6 and 7 is configured as a pair of hydraulic sequencers cross-coupled for oscillation. To that end, there are provided a pair of sequencers 301, 302 having cross-coupled connections generally indicated at 303 connecting the hydraulic source PC and sump PB between the sequencers in such a way as to cause the sequencers to oscillate. A modulated source of hydraulic fluid 305 is provided as an input to the pair of sequencers and the outlet ports are illustrated at 307, demonstrating that the fluid passed through the sequencers in dependence upon the electrical signals provided to the modulator 305 are distributed to the channels connected to output ports 1−n. It is noted that FIGS. 6 and 7 omit certain elements which are peripheral to the multiplexer but which are the same as those illustrated in the prior embodiments. Among the omitted items which will be the same or similar to those illustrated in previous embodiments are: (1) a microprocessor for producing electrical signals to control the modulator 305 for producing appropriately modulated hydraulic signals for the respective channels; (2) feedback means on the sequencers for producing signals indicative of the actuated channels so that the microprocessor can produce the appropriately modulated hydraulic signal for the selected channel; and (3) the channel elements themselves including second stage valves, hydraulic actuators for positioning the elements to be controlled, and feedback means for signalling the microprocessor with position information for the actuators.

In practicing the invention, the hydraulic oscillator means utilizes the cross-coupled hydraulic connection 303 to cause the sequencers 310, 311 to operate in opposite directions, with one of the sequencers being stationary while the other is moving in one or the other of its directions. For example, in the condition illustrated in FIG. 6, hydraulic flow from the port 320 passes through connection 321 to the lower chamber 322 of the sequencer 302 to drive such sequencer upwardly. The multiplexed output port 323 sequentially connects the modulated inlet at port 324 to output ports 6, then 5, then 4 (the illustrated position). When the sequencer 302 is driven to its end limit, a port 325 is opened to couple the high pressure source PC through a conduit 326 to the upper chamber 327 of the opposite sequencer 301. It is therefore seen that the actuator 328 of the sequencer 301 is driven downwardly, thus sequentially activating, by means of valve land 329 the output ports 1, 2, 3 in that order. When the sequencer 328 reaches its lower limit, the control port 330 is opened coupling the high pressure source PC by way of conduit 331 to the upper chamber 332 of sequencer 302, thereby causing the sequencer 302 to be driven in the downward direction. As will now be apparent, the sequencers operate in alternate fashion, first going down, then going up, with the dual sequencers operating in turn such that the modulated input signal provided by source 305 is multiplexed to the channels connected to ports 1-6.

FIG. 7 illustrates an alternative embodiment similar to FIG. 6 in that a pair of sequencers are utilized, but the pair is cross-coupled in such a way that the output channels are serviced in a continuing repeating sequence from 1 through n. In the embodiment of FIG. 7, a pair of cross-coupled sequencers, generally indicated at 350, are provided having an input port 351 fed by a common modulator 352, and a plurality of output ports 355 which have flow controlled by the positions of the sequencers in a fashion similar to that illustrated in connection with FIG. 6. However, the embodiment of FIG. 7 uses a first sequencer 357 which serves to connect the modulated input produced by source 352 from the input port 351 to a series of output ports 361-363. The output ports, in turn, are connected as inputs to the second sequencer 365, and the second sequencer 365 serves to connect the input as passed through the first sequencer individually to one of the output channels 1-6. Thus, in the condition illustrated in FIG. 7, the modulated pressure source coupled to inlet port 351 is coupled through the input manifold to intermediate output port 361, and thence by way of valve portion 367 to output port 3. The cross-coupled ports 303 are the same as illustrated in connection with FIG. 6 and will not be further described. Suffice it to note, however, that in the illustrated condition the lower sequencer 365 is at rest and the upper sequencer 357 is being driven to the left by way of hydraulic source coupled through port 370 and conduit 371 to the right chamber 372 of the sequencer 357. When the sequencer 357 reaches its leftmost limit, a port 373 is opened to couple the hydraulic source by way of conduit 374 to the left chamber 375 of lower sequencer 365, thereby shifting the lower sequencer to the right, aligning ports 367, 367' and 367" with output ports 4, 5 and 6, respectively. After the lower sequencer 365 is thus shifted, the hydraulic source is coupled via a port 376 and conduit 377 to the left chamber 378 of the upper sequencer 357, causing that sequencer to move to the right, sequentially activating ports 361, 362 and 363. By way of the coupling of those ports to the inlet manifolds of the lower sequencer 365, the hydraulic ports 4, 5 and 6 are thereupon actuated in sequence. Thus, at that point the lower sequencer 365 is returned to its leftmost position whereupon the upper sequencer 357 is driven from right to left to sequentially actuate ports 1, 2, 3. It will thus be appreciated that by virtue of the alternating movement of the sequencers 357, 365 by way of the cross-coupled connections, the output ports 1—n are activated in a repeating sequence.

It will now be appreciated that what has been provided is a multiplexed hydraulic control system which shares a single modulated source of hydraulic fluid among a plurality of output channels. The output channels are selected in a predetermined sequence by a multiplexing hydraulic valve which in turn is driven by a hydraulic oscillator. The multiplexing valve may be part of the hydraulic oscillator or simply driven by the hydraulic oscillator, but in either case, the oscillator is the driving means for causing the multiplexer to sequence. The substantial force margins provided by the hydraulic oscillator, as contrasted with dedicated electrical actuators, provide a substantial margin of reserve actuating force for the multiplexer in systems where such a safety factor is needed or desired.

What is claimed:

1. A multiplexed hydraulic control system having a plurality of channels for individually controlling the positions of a plurality of actuators in the respective channels in accordance with a corresponding plurality of electrical control signals, the control system comprising the combination of:

a multiplexer including at least one hydraulic cylinder having an input port and a plurality of output ports, the hydraulic cylinder having reciprocatable operator means therein for individually connecting the input port to individual ones of the output ports;

hydraulic oscillator means associated with the multiplexer for causing an oscillating reciprocating motion of the multiplexer operator means to sequentially connect the input port to the respective output ports as the operator means reciprocates due to said oscillation;

and means coordinated with the position of the multiplexer operator means for modulating the multiplexer input in accordance with the electrical control signal corresponding to the output port of the channel then connected to the input port, thereby to control the actuators in the respective channels in accordance with the plurality of electrical control signals for the respective channels.

2. The multiplexed hydraulic control system of claim 1 in which the hydraulic oscillator means further comprises a hydraulic cylinder, control valve means for controllably coupling a hydraulic source to the hydraulic cylinder for driving said hydraulic cylinder at a given rate, and reversing means interconnecting the multiplexer and the control valve for reversing the hydraulic cylinder whereby the control valve establishes the direction and flow rate to the hydraulic cylinder thereby to establish the direction and rate of movement of the multiplexer operator means.

3. The multiplexed hydraulic control system of claim 2 wherein said reversing means includes a conduit for passing modulated fluid flow from the multiplexer to the control valve means;
the means coordinated with the position of the multiplexer operator serving to provide fluid flow through said conduit to the control valve for reversing the direction of multiplexer travel.

4. The multiplexed hydraulic control system of claim 2 in which the hydraulic cylinder is a double-acting cylinder, and the control valve means including means for controllably coupling a hydraulic source and hydraulic sump to the double-acting cylinder.

5. The multiplexed hydraulic control system of claim 1 in which the hydraulic oscillator means further comprises a control valve supplying fluid to a hydraulic actuator to produce said oscillating reciprocating motion in the multiplexer operator means, and means interconnecting hydraulic signals signifying the respective ends of multiplexer operator travel to the control valve for controlling the reversal of the hydraulic actuator at the respective ends of the travel of the multiplexer operator means.

6. The multiplexed hydraulic control system of claim 1 in which the hydraulic oscillator means further comprises a double-acting hydraulic cylinder;
the multiplexer further including means for producing a mechanical signal indicating the respective ends of the multiplexer operator means travel;
the hydraulic oscillator means further including means responsive to said mechanical signal for reversing fluid flow to the double-acting hydraulic cylinder thereby to reverse the direction of the multiplexer operator means.

7. The multiplexed hydraulic control system of claim 6 in which the means responsive to the mechanical signal includes a spool valve having a spool driven in response to said mechanical signal in a first or a second direction depending on the particular end of travel reached by the multiplexer operator means, and port means within the spool valve for driving the spool to a predetermined position upon initiation of spool movement by said mechanical signal.

8. The multiplexed hydraulic control system of claim 7 in which the multiplexer includes at least two input ports, and the spool valve includes port means for feeding the modulated multiplexer input to one or the other of the input ports for causing the sequencing of the output channels in repeating sequential order from 1 through n.

9. The multiplexed hydraulic control system of claim 6 in which the multiplexer includes a plurality of intermediate ports interconnecting the input port with the plurality of output ports, and intermediate valve operator means switchable upon the multiplexer operator means reaching one or the other of its ends of travel for switching the intermediate ports for causing the multiplexer to service the channels in repeating sequential order from 1 through n.

10. The multiplexed hydraulic control system of claim 1 in which the hydraulic oscillator means includes a double-acting hydraulic actuator fed from a jet pipe controlled spool valve, and means for providing electrical signals to the jet pipe for controlling the position of the spool valve and thereby the rate and direction of travel of the multiplexer operator means.

11. The multiplexed hydraulic control system of claim 1 in which the multiplexer valve comprises at least two multiple port sequencers each having an input port and a plurality of output ports connected to the channels;
the hydraulic oscillator means including cross-coupled hydraulic connections between the two sequencers for initiating motion of one sequencer at the end of travel of the other thereby to cause the oscillation of the two multiple port sequencers.

12. The multiplexed hydraulic control system of claim 1 in which the multiplexer valve includes at least two multiple port sequencers each having an input port and a plurality of output ports connected to the respective channels;
the multiple port sequencers also each including a pair of drive input ports for driving the associated sequencer in a first or a second direction;
the hydraulic oscillator means including cross-connections between the drive input ports of one sequencer and the opposite sequencer for causing the alternative movement of the sequencers in a first or a second direction, such movement alternating between sequencers such that one is moving while the other is at rest.

13. The multiplexed hydraulic control system of claim 12 in which the input port of one sequencer is connected to the output ports of the other sequencer, said connections being so constructed and arranged that the channels are serviced in repeating sequential order from 1 through n.

14. A multiplexed hydraulic control system having a plurality of channels for individually controlling the positions of a plurality of actuators in the respective channels in accordance with a corresponding plurality of electrical control signals, the control system comprising the combination of:
a multiplexer having an input port and a plurality of individual output ports, reciprocatable multiplexer operator means in the multiplexer for individually connecting the input port to individual ones of the output ports;
hydraulically actuated means mechanically coupled to the multiplexer operator means, a multiplexer control valve for selectively applying hydraulic pressure to the hydraulically actuated means for causing the hydraulically actuated means to oscillate between first and second end positions;
the mechanical connection between the hydraulically actuated means and the multiplexer operator means serving to sequentially connect the multiplexer input to the respective outputs as the hydraulically actuated means oscillates;
and means coordinated with the position of the hydraulically actuated means for modulating the input to the multiplexer in accordance with the electrical control signal corresponding to the output port of the channel then connected to the multiplexer input, thereby to control the actuators in the respective channels in accordance with the plurality of electrical control signals for the respective channels.

15. The multiplexed hydraulic control system of claim 14 in which the hydraulically actuated means further includes means interconnecting hydraulic signals signifying the respective ends of multiplexer operator means travel to the control valve for controlling reversal of the hydraulically actuated means at the respective ends of the stroke of the multiplexer operator means.

16. The multiplexed hydraulic control system of claim 14 in which the hydraulically actuated means further includes a double-acting hydraulic actuator adapted for oscillation between said first and second end positions;
the multiplexer further including means for producing a mechanical signal indicating the respective ends of the multiplexer operator means travel;
the hydraulically actuated means further including means responsive to said mechanical signal for reversing fluid flow to the double-acting hydraulic actuator thereby to reverse the direction of the multiplexer operator means.

17. The multiplexed hydraulic control system of claim 16 in which the control valve is a spool valve having means responsive to the mechanical signal and driven in response to said mechanical signal in a first or a second direction depending on the particular end of travel reached by the multiplexer operator means, and port means within the spool valve for driving the spool to a predetermined position upon initiation of spool movement by said mechanical signal.

18. The multiplexed hydraulic control system of claim 17 in which the multiplexer includes at least two input ports, and the spool valve includes port means for feeding the multiplexer input to one or the other of the input ports for causing the sequencing of the output channels in repeating sequential order from 1 through n.

19. The multiplexed hydraulic control system of claim 16 in which the multiplexer includes a plurality of intermediate ports interconnecting the input port with the plurality of output ports, and intermediate valve operator means switchable upon the multiplexer operator means reaching one or the other of its ends of stroke for switching the intermediate ports for causing the multiplexer to service the channels in repeating sequential order from 1 through n.

20. The multiplexed hydraulic control system of claim 14 in which the hydraulically actuated means includes a double-acting hydraulic actuator fed from a jet pipe controlled spool valve, and means for providing electrical signals to the jet pipe for controlling the position of the spool valve and thereby the rate and direction of the multiplexer operator means.

21. A multiplexed hydraulic control system having a plurality of channels for individually controlling the positions of a plurality of actuators in the respective channels in accordance with a corresponding plurality of electrical control signals, the control system comprising the combination of:
a multiplexer having an input port and a plurality of output ports, operator means within the multiplexer for sequentially and individually connecting the input port to the output ports;
hydraulic oscillator means associated with the multiplexer, means coupling the hydraulic oscillator means to a pressurized source of hydraulic fluid for causing oscillation of the hydraulic oscillator;
means responsive to the oscillation of the hydraulic oscillator for driving the multiplexer to sequentially connect the input port to individual ones of the output ports;
and means for producing a modulated source of hydraulic signals corresponding to the plurality of electrical control signals and coupling said modulated hydraulic signals to the multiplexer input in coordination with the sequencing of the output ports thereby to control the actuators in the respective channels in accordance with the plurality of electrical control signals for the respective channels.

* * * * *